(12) United States Patent
Munoz-Bustamante et al.

(10) Patent No.: US 9,628,517 B2
(45) Date of Patent: Apr. 18, 2017

(54) NOISE REDUCTION DURING VOICE OVER IP SESSIONS

(75) Inventors: Carlos Munoz-Bustamante, Durham, NC (US); Joseph Michael Pennisi, Apex, NC (US); Randall Scott Springfield, Chapel Hill, NC (US); Ephraim D. Starr, Palos Verdes Estates, CA (US); Yasushi Tsukamoto, Yamato (JP); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 893 days.

(21) Appl. No.: 12/749,942

(22) Filed: Mar. 30, 2010

(65) Prior Publication Data

US 2011/0243123 A1    Oct. 6, 2011

(51) Int. Cl.
*H04L 29/06* (2006.01)
(52) U.S. Cl.
CPC ................................. *H04L 65/1053* (2013.01)
(58) Field of Classification Search
CPC .................................................. H04L 65/1053
USPC .......................................................... 370/352
See application file for complete search history.

(56) References Cited

U.S. PATENT DOCUMENTS

| | | | |
|---|---|---|---|
| 5,175,798 A * | 12/1992 | Taylor et al. .................... | 706/43 |
| 5,655,127 A * | 8/1997 | Rabe et al. ..................... | 713/322 |
| 5,825,351 A | 10/1998 | Tam .............................. | 345/173 |
| 6,935,797 B2 * | 8/2005 | Sim ............................... | 400/472 |
| 2005/0275637 A1 * | 12/2005 | Hinckley et al. .............. | 345/173 |
| 2006/0161871 A1 | 7/2006 | Hotelling et al. ............ | 715/863 |
| 2006/0167995 A1 * | 7/2006 | Rui ............................... | 709/204 |
| 2008/0118082 A1 * | 5/2008 | Seltzer et al. ............... | 381/94.1 |
| 2008/0279366 A1 * | 11/2008 | Lindbergh ..................... | 379/421 |
| 2009/0262928 A1 * | 10/2009 | Busari ............................ | 380/46 |
| 2010/0014681 A1 * | 1/2010 | Sugiyama ....................... | 381/56 |
| 2010/0027810 A1 * | 2/2010 | Marton ......................... | 381/94.1 |
| 2011/0112831 A1 * | 5/2011 | Sorensen et al. ............. | 704/226 |
| 2011/0175832 A1 * | 7/2011 | Miyazawa et al. ............ | 345/173 |

OTHER PUBLICATIONS

Subramanya et al., "Automatic Removal of Typed Keystrokes from Speech Signals", Sep. 21, 2006, Interspeech, pp. 1-4., <research.microsoft.com/pubs/77535/2006-mseltzer-interspeech.pdf>.*
Roger Morrison, "Design of a True Random Number Generator Using Audio Input", Jun. 2001, Journal of Craptology vol. 1, No. 1, Jun. 2001. pp. 1-4, <cs.ucsb.edu/~koc/cren/project/pp/morrison.pdf>.*

* cited by examiner

*Primary Examiner* — Asad Nawaz
*Assistant Examiner* — Saad A Waqas
(74) *Attorney, Agent, or Firm* — John L. Rogitz; John M. Rogitz

(57) ABSTRACT

An approach is provided that, upon receiving a keyboard event, reduces a volume of an audio input channel from a first volume level to a lower volume level. After the volume of the audio input channel is reduced, the approach waits until a system event occurs, with the system event based at least in part on the occurrence of a nondeterministic event. The volume of the audio input channel is then increased from the lower volume level to a higher volume level when the system event occurs

11 Claims, 6 Drawing Sheets

NOISE REDUCTION DURING VOICE OVER IP SESSIONS

BACKGROUND OF THE INVENTION

During Voice Over Internet Protocol (VoIP) telephone calls, users type on their keyboards while engaged in conversation. While being able to type and talk during a discussion is often useful, unfortunately the noise generated by the typing can be heard by the person on the other end of the VoIP call.

SUMMARY

An approach is provided that, upon receiving a keyboard event, reduces a volume of an audio input channel from a first volume level to a lower volume level. After the volume of the audio input channel is reduced, the approach waits until a system event occurs, with the system event based at least in part on the occurrence of a nondeterministic event. The volume of the audio input channel is then increased from the lower volume level to a higher volume level when the system event occurs.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments described herein may be better understood by referencing the accompanying drawings, wherein.

DETAILED DESCRIPTION

Certain specific details are set forth in the following description and figures to provide a thorough understanding of various embodiments. Certain well-known details often associated with computing and software technology are not set forth in the following disclosure, however, to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of embodiments, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the embodiments. A networked environment is illustrated in FIG. 2 as an extension of the basic computing environment, to emphasize that modern computing techniques can be performed across multiple discrete devices.

Figure 1:
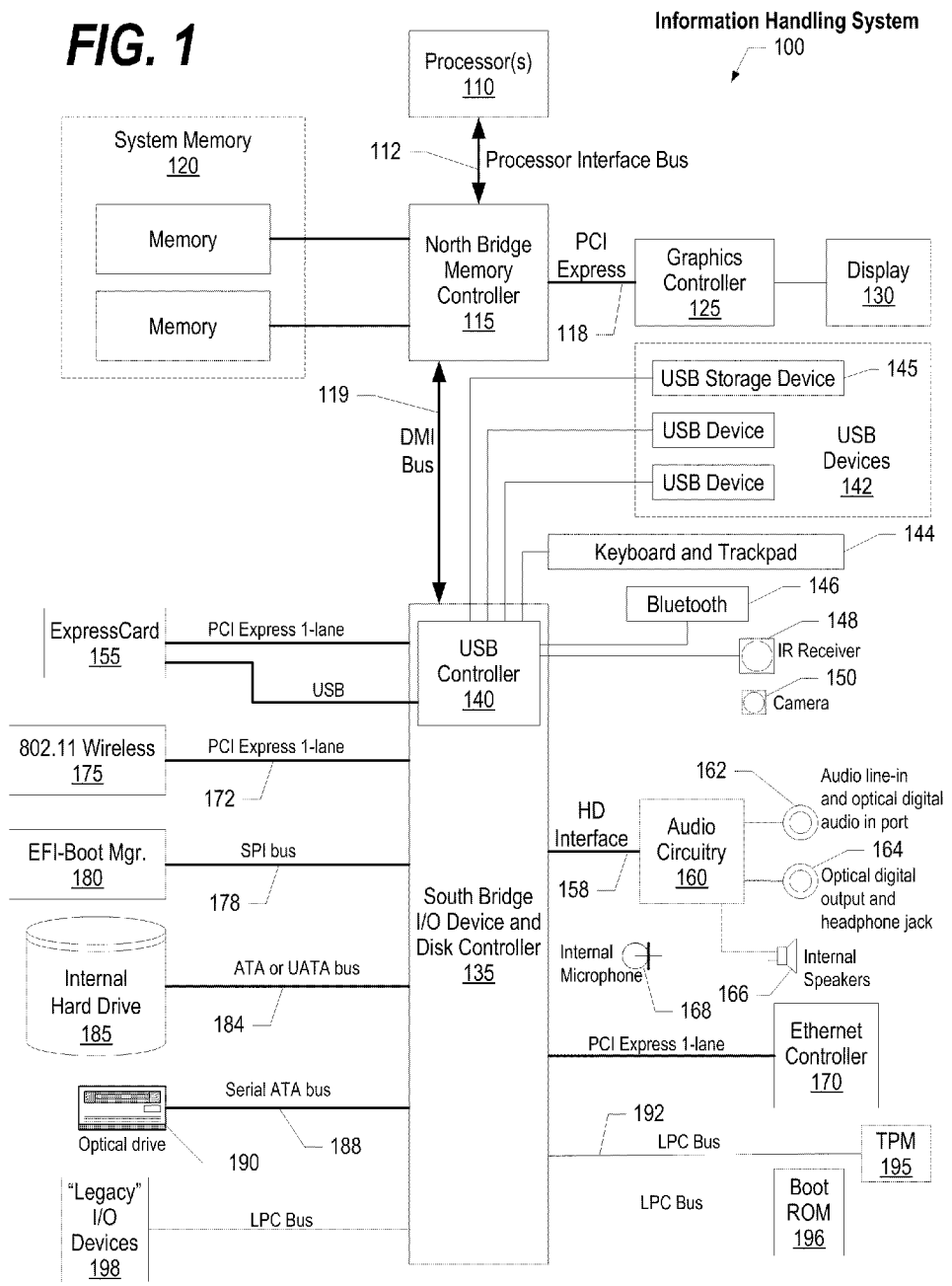
FIG. 1 is a block diagram of a data processing system in which the methods described herein can be implemented.
Figure 2:
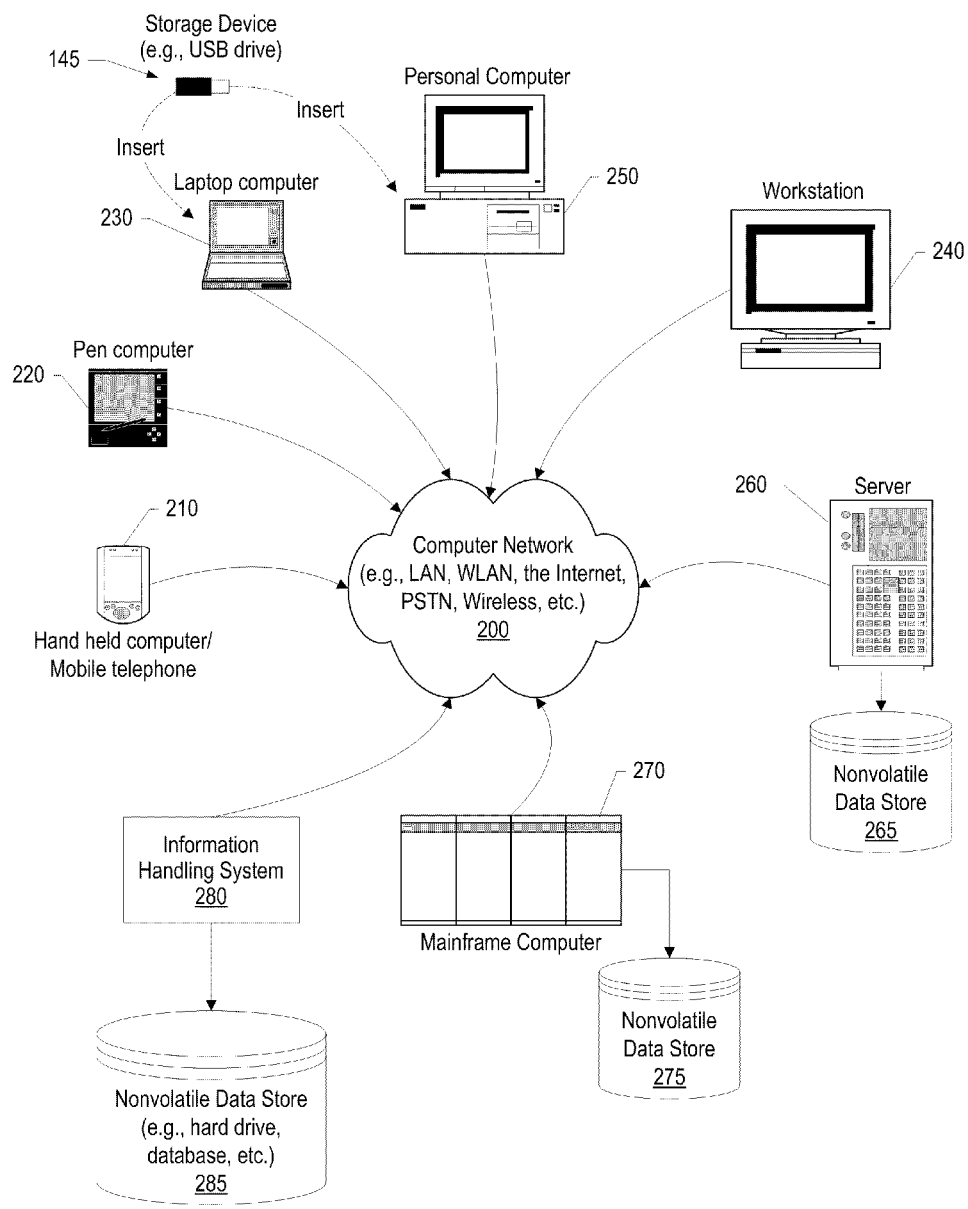
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Extensible Firmware Interface (EFI) manager 180 connects to Southbridge 135 via Serial Peripheral Interface (SPI) bus 178 and is used to interface between an operating system and platform firmware. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
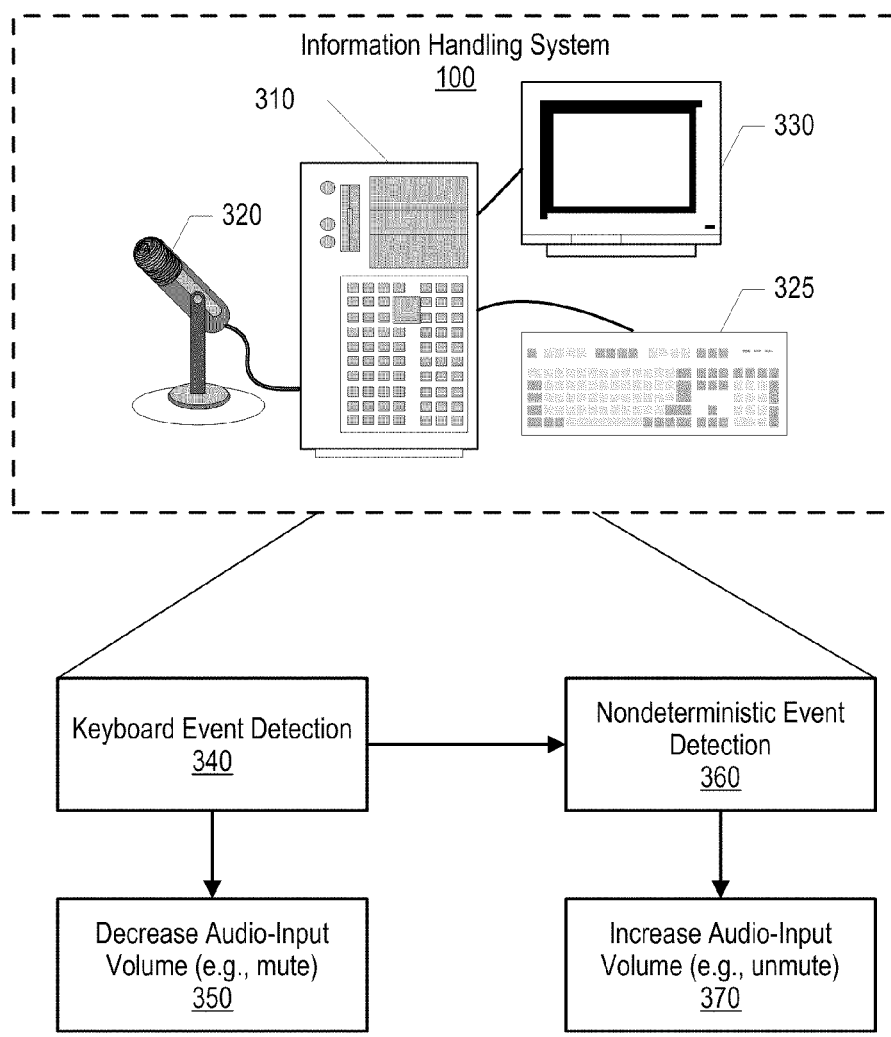
FIG. 3 is a diagram various components in an information handling system that reduces keyboard noise during a VoIP session.

FIG. 3 is a diagram various components in an information handling system that reduces keyboard noise during a VoIP session. Information handling system 100 further includes computer system case 310, microphone 320, keyboard 325, and video display 330. In a desktop environment, one or more of components 320-330 may be separate from computer system case 310, while in a non-desktop environment, such as in a laptop computer system, one or more of components 320-330 may be integrated in computer system case 310. When the noise reduction technology is activated (e.g., when the user of information handling system 100 is engaged in a VoIP telephone session, etc.), then keyboard event detection 340 is used to detect the user's selection (pressing, striking, etc.) of a key on keyboard 325. In one embodiment, keyboard event detection 340 detects the "release" of a key by the user. When this is detected, decrease audio-input process 350 occurs to rapidly decrease the volume of the audio input channel corresponding to microphone 320. The system then waits for detection of a nondeterministic system event at 360. Nondeterministic events include two classes of events —environment based nondeterministic events that are not based on waiting for a random period of time and time-based nondeterministic events that are based on setting a timer to a random period of time. When the nondeterministic system event is detected, increase audio-input volume 370 occurs in order to rapidly increase the volume. If intervening keyboard events occur before the nondeterministic event is detected, then the nondeterministic event is changed so that it occurs after the later arriving keystrokes. In this manner, keyboard noise generated by the user during a VoIP session is reduced in a nondeterministic manner so that the user can type on the keyboard and keep much of the sounds from reaching the other party, or parties, to the VoIP session. The nondeterministic (e.g., pseudo-random) aspect of the delay before increasing the audio-input volume also prevents background noise sometimes caused by decreasing/increasing of the volume without any particular cadence, pulse, beat, or tempo that can be otherwise detected by the other parties of the VoIP session. As used herein, "keyboard" can be a traditional keyboard apparatus (e.g., connected wirelessly or wired to a desktop computer system, integrated with a laptop computer system, etc.) as well as other keyboards, such as virtual keyboards and the like that display keys using projection (e.g., laser projection) and allow users to touch spaces where the keys are displayed. Other types of possible keyboards include membrane keyboards, dome-switch keyboards, scissor-switch keyboards, capacitive keyboards, mechanical switch keyboards, buckling-spring keyboards, Hall-effect keyboards, laser keyboards, roll-up keyboards, and touch-screen keyboards (e.g., touch-screen keypads, etc.) that display keys on a visual display device and sense a user touching the screen at a location corresponding to the displayed keys. Furthermore, keyboard events can include any event triggered by a user selecting any key on any type of keyboard as described above. Keyboard events can also include events that occur before a key is actually pressed or selected, such as an event generated using proximity based detectors that detect that a key is "about" to be pressed or selected by a user.

Figure 4:
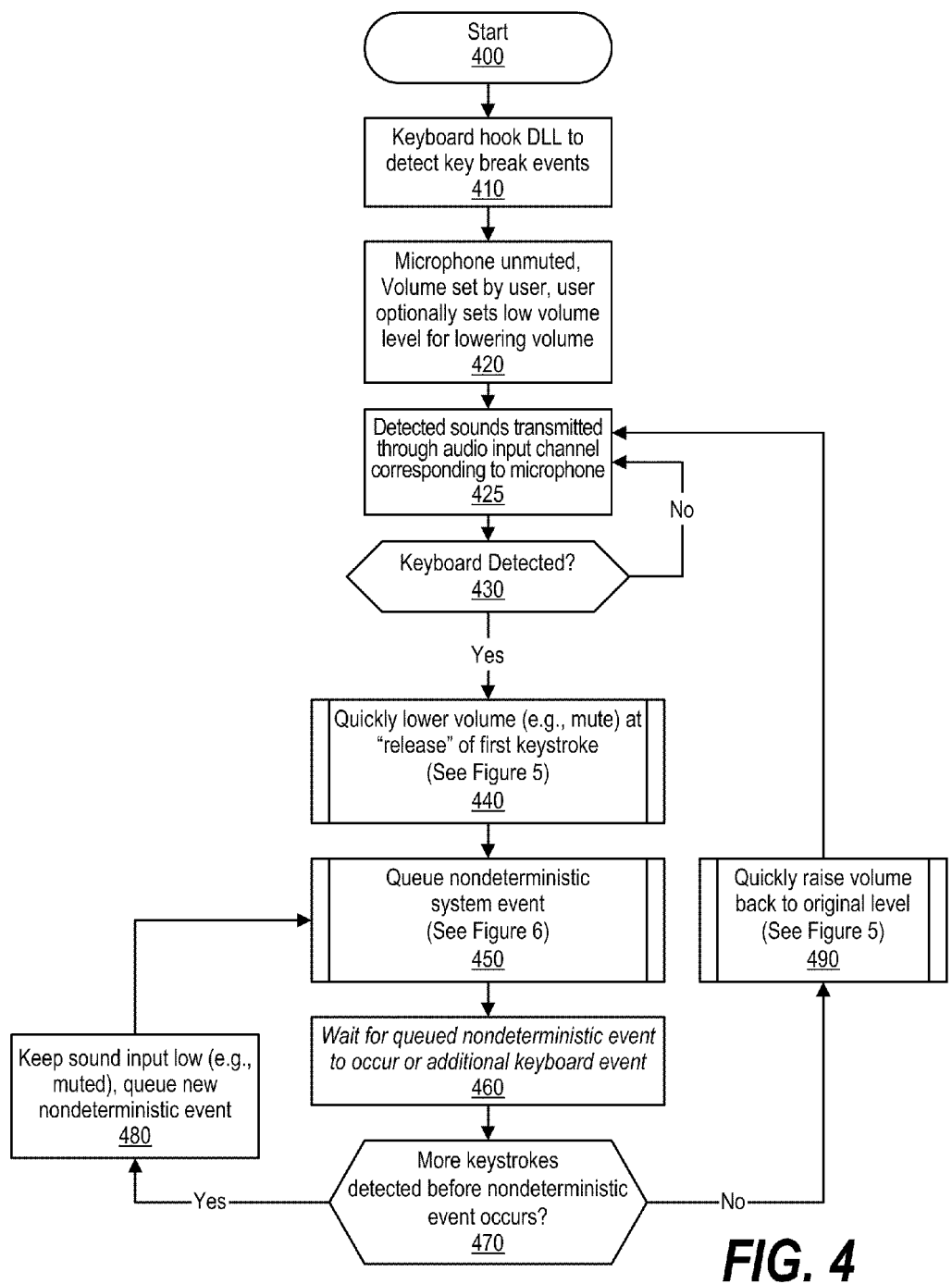
FIG. 4 is a flowchart showing higher level steps used in an approach that reduces keyboard noise during a VoIP session.

FIG. 4 is a flowchart showing higher level steps used in an approach that reduces keyboard noise during a VoIP session. When the technology is invoked (e.g., by the user, automatically when a VoIP session is started, etc.), processing commences at 400 whereupon, at step 410, a keyboard hook DLL is invoked to detect keyboard events, such as key break events that occur when the user releases a key on the keyboard. At step 420, the process begins with the microphone unmuted and the audio input channel corresponding to the microphone set to a particular volume set by the user. As used herein, "volume" refers to any sound quality used to control the audibility of input sounds including but not limited to loudness, frequency, bandwidth, amplitude, sound pressure, and sound dynamics.

At step 425, sounds are received at the microphone (e.g., the user speaking, background room noises, etc.) and transmitted through the corresponding audio input channel. In a VoIP setting, these transmitted sounds are then transmitted through a network (e.g., the Internet) according to a particular protocol. While sounds are being received and transmitted, a decision is continually made using the keyboard hook DLL as to whether a keyboard event is detected (decision 430). In one embodiment, the keyboard event that is being detected is the key "release" event that occurs when the user releases a key on the keyboard having first pressed it. If the keyboard event is not detected, processing continues to detect sounds at the microphone and transmit the sounds through the corresponding audio input channel.

Figure 5:
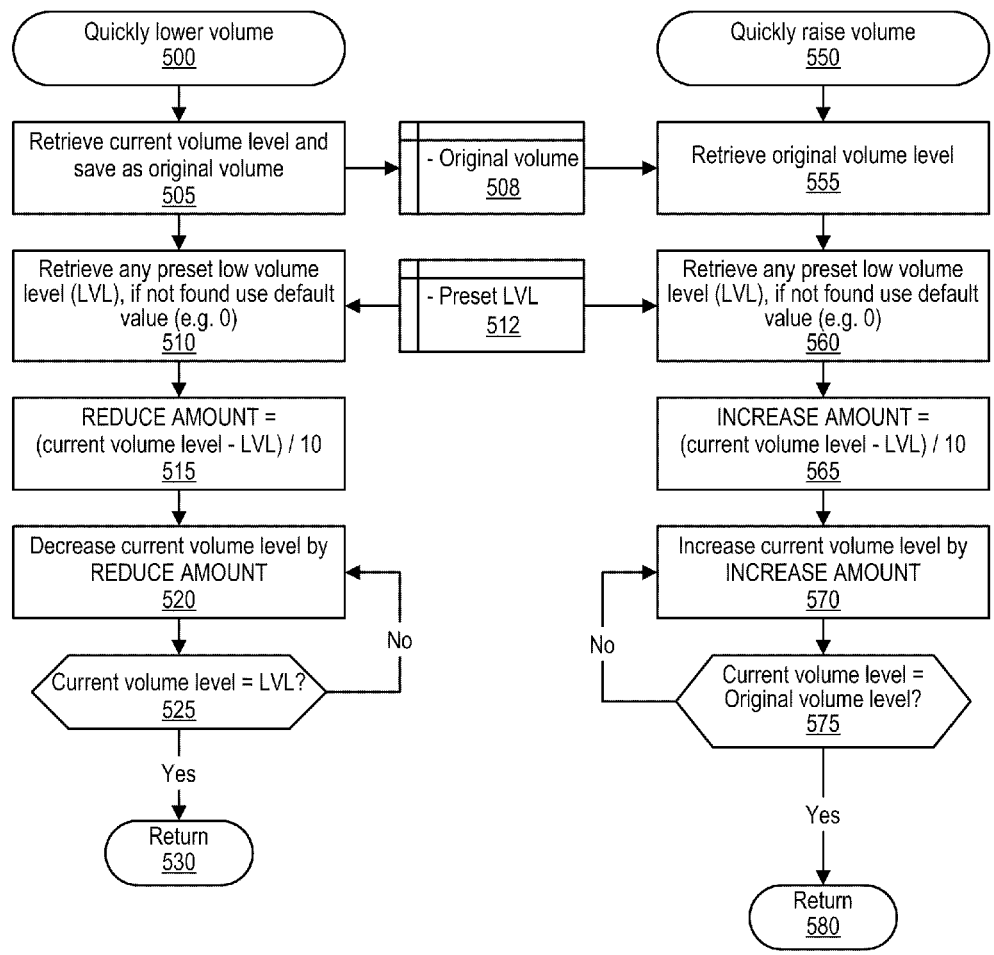
FIG. 5 is a flowchart showing steps that lower the volume when a keystroke is detected as well as steps that raise the volume back to the original level.

However, when a keyboard event (e.g., a key "release" event) is detected, decision 430 branches to the "yes" branch whereupon, at predefined process 440, the system quickly lowers the volume of the audio input channel (see FIG. 5 and corresponding text for processing details). In one embodiment, the sound is muted at predefined process 440, while in another embodiment, as shown in FIG. 5, the sound is rapidly decreased down to a low level. The low level might not be zero but simply low enough so that the keyboard noises are sufficiently quiet so that they are either not heard by the other parties to the VoIP session or are not bothersome to the other parties to the VoIP session. In some embodiments, quickly reducing (and quickly raising the volume as shown in predefined process 490) reduce audible "clicking" noises that might otherwise occur if the audio input channel was simply muted and unmuted. At predefined process 450, a nondeterministic system event is queued (see FIG. 6 and corresponding text for processing details). The nondeterministic system event is designed so that it is highly likely to occur within an acceptable period after the audio input channel volume was lowered and is also designed to be a different periods each time predefined process 450 is performed rather than being a fixed or set period.

At step 460, the process waits for either the queued nondeterministic event to occur or for one or more additional keyboard event(s) to occur before the nondeterministic event occurs. A determination is made as to whether additional keyboard events were detected before the nondeterministic event occurred (decision 470). If keyboard events were received first, then decision 470 branches to the "yes" branch which, at step 480, keeps the audio input channel volume at the low level and loops back to queue a new nondeterministic system event (predefined process 450).

This looping continues until the nondeterministic system event occurs before additional keyboard events are detected, at which point decision 470 branches to the "no" branch whereupon, at predefined process 490, the volume is quickly raised back to the original volume level (see FIG. 5 and corresponding text for processing details). In one embodiment, introduced above, the volume is muted/unmuted rather than lowered and raised. In this embodiment, the volume is unmuted at predefined process 490. Processing then loops back to step 425 where sounds are detected at the microphone and transmitted though audio input channel at the original volume level.

FIG. 5 is a flowchart showing steps that lower the volume when a keystroke is detected as well as steps that raise the volume back to the original level. Processing used to quickly lower the volume level is shown commencing at 500 and the processing used to quickly raise the volume level is shown commencing at 550. Referring now to the processing used to quickly lower the volume level, processing commences at 500 whereupon, at step 505, the current volume level is retrieved (e.g., from the audio input channel) and saved as original volume in memory area 508. At step 510, any user-configured or preset low volume level is retrieved from memory area 512. If a user-configured low volume level is not found or has not been set by the user, then a default low volume level can be used. As shown, the low volume level can be zero or any value greater than zero. At step 515, a reduction amount is computed by subtracting the low volume level from the current volume level and then dividing this difference by a divisor with the divisor indicating the number of times the volume is quickly reduced (e.g., ten times, etc.). At step 520, the current volume is decreased by the reduce amount resulting in a lower current volume. A determination is made as to whether the current volume level is equal to the desired low volume level (decision 525). If the current volume level is not yet equal to the desired low volume level, then decision 525 branches to the "no" branch which loops back to decrease the current volume level again by the reduce amount. This looping occurs quickly and continues until the current volume level is equal to the desired low volume level, at which point decision 525 branches to the "yes" branch and processing returns to the calling routine (see FIG. 4) at 530.

Referring now to the processing used to quickly raise the volume level, processing commences at 550 whereupon, at step 555, the original volume level is retrieved from memory area 508. At step 560, any user-configured or preset low volume level is retrieved from memory area 512. If a user-configured low volume level is not found or has not been set by the user, then a default low volume level is be used. At step 565, an increase amount is computed by subtracting the low volume level from the current volume level and then dividing this difference by a divisor with the divisor indicating the number of times the volume is quickly raised (e.g., ten times, etc.). At step 570, the current volume (previously set to the low volume level) is increased by the increase amount resulting in a higher current volume. A determination is made as to whether the current volume level is equal to the original volume level (decision 575). If the current volume level is not yet equal to the original volume level, then decision 575 branches to the "no" branch which loops back to increase the current volume level again by the increase amount. This looping occurs quickly and continues until the current volume level is equal to the original volume level, at which point decision 575 branches to the "yes" branch and processing returns to the calling routine (see FIG. 4) at 580.

Figure 6:
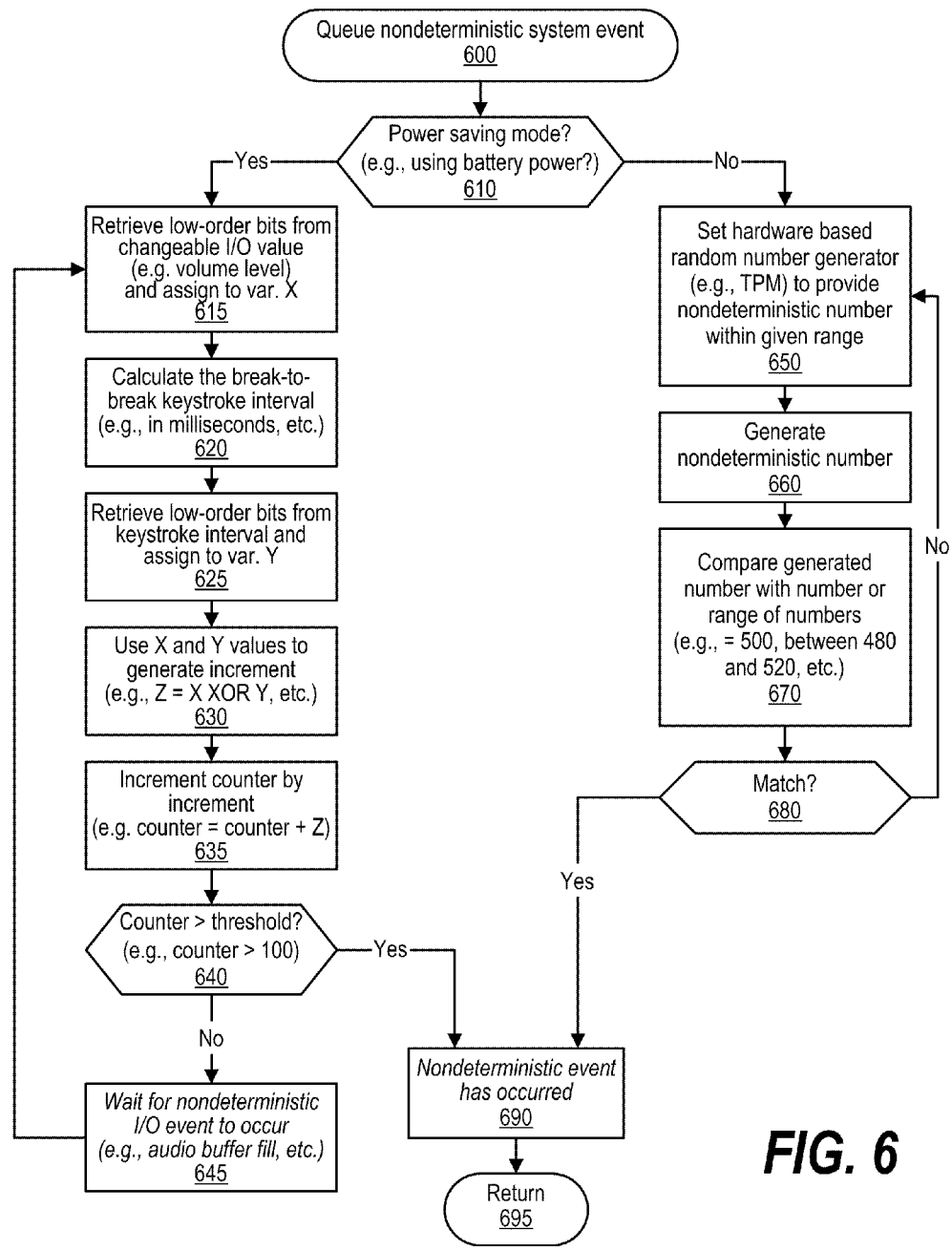
FIG. 6 is a flowchart showing an approach that queues a random system event in order to randomize the delay between the keyboard event and the raising of the volume back to the original level.

FIG. 6 is a flowchart showing an approach that queues a random system event in order to randomize the delay between the keyboard event and the raising of the volume back to the original level. Processing commences at 600 whereupon a determination is made as to whether a power saving mode is currently being used by the system (decision 610, e.g., a system running on battery power, a laptop system, etc.). If the power saving mode is currently being used by the system, then decision 610 branches to the "yes" branch to queue a nondeterministic event using steps 615 to 645.

At step 615, low-order bits are received from a changeable I/O value, such as that found in an audio codec that encodes digital data streams or signals corresponding to a sound input. At step 620, a break-to-break keystroke interval is calculated (e.g., using the keyboard hook DLL that detects keyboard events). At step 625, low-order bits are retrieved from the calculated interval (e.g., stored in milliseconds, etc.). At step 630, a value is generated by using a logical operation, such as an XOR operation, that takes the two sets of low-order input values as inputs to the operation. This value is used to increment a counter in step 635. A determination is made as to whether the counter has reached a particular threshold (decision 640). If the counter has not yet reached the threshold, then decision 640 branches to the "no" branch whereupon, at step 645, the system waits for a nondeterministic I/O event to occur, such as waiting for a particular buffer to fill, etc. When the nondeterministic I/O event occurs, processing loops back to receive a new set of low order bits (steps 615-625) and generate a new increment value (step 630) that is used to again increment the counter. Decision 640 once again compares the counter with the threshold. If the counter has not yet reached the threshold, the "no" branch is again taken, processing waits for a new nondeterministic I/O event to occur, and processing again loops back to retrieve new low-order bits and calculate a new increment value. This looping continues until the counter meets the threshold value at which point decision 640 branches to the "yes" branch whereupon, at step 690, the nondeterministic system event is deemed to have occurred, and processing returns to the calling routine (see FIG. 4) at 695.

Returning to decision 610, if a power saving mode is not being used, then decision 610 branches to the "no" branch which uses steps 650 to 680 to detect the occurrence of a nondeterministic system event. At step 650, a hardware-based random number generator (RNG) is set to provide a nondeterministic random number within a given range of numbers. At step 660, a nondeterministic number is generated using the hardware-based random number generator. At step 670, the generated number is compared with a particular number or range of numbers (e.g., a particular number such as "500" or a range of numbers such as any number between "480 and 520," etc.). A determination is made as to whether the generated number matches the number or range of numbers (decision 680). If a match did not occur, then decision 680 loops back to re-generate a new random number and again perform the comparison. This looping continues until a match is found, at which point decision 680 branches to the "yes" branch whereupon, at step 690, the nondeterministic system event is deemed to have occurred, and processing returns to the calling routine (see FIG. 4) at 695.

One of the intended implementations is a software application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, embodiments may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   predicting a keyboard event prior to the keyboard event, the predicting based at least in part on input from a proximity sensor;
   reducing a volume of an audio input channel from a first volume level to a lower volume level in response to the predicting of the keyboard event;
   after the volume of the audio input channel is reduced, waiting until a system event occurs, wherein the system event is based at least in part on a first event; and
   increasing the volume of the audio input channel from the lower volume level to a higher volume level in response to the occurrence of the system event;
   wherein the first event is based at least in part on a first set of low-order bits from a first changeable input/output (I/O) value but not on higher order bits from the first changeable I/O value, and wherein the method further comprises:

creating the system event, the creating comprising:
generating a value based upon a logical operation that uses the first set of low-order bits as input values;
retrieving a second set of one or more low-order bits from a second changeable I/O value, wherein generating the value further comprises using the first and second sets of low-order bits as input values to the logical operation;
forming a number based on the value;
comparing the formed number with one or more predefined numbers, wherein the system event occurs based on the comparison; and
repeating at least one of the retrieving, the generating, the forming, and the comparing until the system event occurs.

2. The method of claim 1 wherein the keyboard event is a release event of a key pressed by a user, and wherein the method further comprises:
detecting one or more additional keyboard events after the volume of the audio input channel has been reduced and before the occurrence of the system event; and
identifying a second event after the one or more additional keyboard events is detected, wherein the system event is based at least in part on the second event, and wherein the volume of the audio input channel is increased from the lower volume level to the higher volume level after the occurrence of the system event.

3. The method of claim 1 wherein the reducing of the volume further comprises:
calculating an incremental reduction amount by subtracting a lower volume level from a current volume level and dividing by an increment count; and
repeatedly decreasing the current volume by the incremental reduction amount until the current volume reaches the lower volume level.

4. The method of claim 3 wherein the lower volume level is a user-configurable volume level.

5. An information handling system comprising:
one or more processors;
a memory accessible by at least one of the processors;
a keyboard that generates signals detectable by at least one of the processors;
an audio input channel corresponding to a microphone, the audio input channel receiving audible signals which are accessible by at least one of the processors;
a set of instructions stored in the memory and executable by at least one of the processors to:
predict a keyboard event at the keyboard based at least in part on input from a proximity detector;
reduce a volume of the audio input channel from a first volume level to a lower volume level in response to the prediction;
after the volume of the audio input channel is reduced, wait until a system event occurs, wherein the system event is based at least in part on a first event; and
increase the volume of the audio input channel from the lower volume level to a higher volume level in response to the occurrence of the system event;
wherein the first event is based at least in part on a first set of low-order bits from a first changeable input/output (I/O) value, and wherein the instructions are further executable to: create the system event at least in part based on generation of a value based upon a logical operation that uses the first set of low-order bits as input values; wherein the instructions are further executable to create the system event at least in part based on:
retrieval of a second set of one or more low-order bits from a second changeable I/O value, wherein generation of the value further comprises usage of the first and second sets of low-order bits as input values to the logical operation; formation of a number based on the value;
comparison of the formed number with one or more predefined numbers, wherein the system event occurs based on the comparison; and
repetition of at least one of the retrieval, the generation, the formation, and the comparison until the system event occurs.

6. The information handling system of claim 5 wherein the keyboard event is a release event of a key pressed by a user, and wherein the instructions are further executable to:
detect one or more keyboard events after the volume of the audio input channel has been reduced and before the occurrence of the system event; and
identify a second event after the one or more keyboard events are detected, wherein the system event is based at least in part on the second event, and wherein the volume of the audio input channel is increased from the lower volume level to the higher volume level after the occurrence of the system event.

7. The information handling system of claim 5 wherein the instructions are further executable to reduce the volume at least in part based on:
calculation of an incremental reduction amount by subtraction of a lower volume level from a current volume level and division by an increment count; and
a repeated decrease of the current volume by the incremental reduction amount until the current volume reaches the lower volume level.

8. The information handling system of claim 7 wherein the lower volume level is a user-configurable volume level.

9. A computer readable storage medium that is not a transitory signal, the computer readable storage medium comprising instructions executable by a processor to:
predict a keyboard event prior to the keyboard event;
reduce a volume of an audio input channel from a first volume level to a lower volume level in response to the prediction;
after the volume of the audio input channel is reduced, wait until a system event occurs, wherein the system event is based at least in part on a first event; and
increase the volume of the audio input channel from the lower volume level to a higher volume level in response to the occurrence of the system event
wherein the instructions are further executable to:
create the system event at least in part based on generation of a value based upon a logical operation that uses as input values a first set of low-order bits from a first changeable input/output (I/O) value; and
wherein the instructions are further executable to create the system event at least in part based on:
retrieval of a second set of one or more low-order bits from a second changeable I/O value, wherein generation of the value further comprises usage of the first and second sets of low-order bits as input values to the logical operation;
formation of a number based on the value;
comparison of the formed number with one or more predefined numbers, wherein the system event occurs based on the comparison; and repetition of at least one of the retrieval, the generation, the formation, and the comparison until the system event occurs.

10. The computer readable storage medium of claim 9 wherein the instructions are further executable to reduce the volume at least in part based on:
   calculation of an incremental reduction amount by subtraction of a lower volume level from a current volume level and division by an increment count; and repeated decrease of the current volume by the incremental reduction amount until the current volume reaches the lower volume level.

11. The computer readable storage medium of claim 9 wherein the first event is based at least in part on a first criterion responsive to an information handling system controllable by the processor being in a first power mode, the first event being based at least in part on a second criterion responsive to the information handling system being in a second power mode, the first criterion being different from the second criterion and the first power mode being different from the second power mode.

\* \* \* \* \*